United States Patent
Broyles

(10) Patent No.: US 7,343,516 B2
(45) Date of Patent: Mar. 11, 2008

(54) METHOD FOR VERIFYING THERMAL AND POWER COMPATIBILITY OF COMPONENTS IN A COMPUTER SYSTEM

(75) Inventor: Paul Broyles, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 553 days.

(21) Appl. No.: 10/699,523

(22) Filed: Oct. 31, 2003

(65) Prior Publication Data

US 2005/0094329 A1    May 5, 2005

(51) Int. Cl.
*G06F 11/00* (2006.01)

(52) U.S. Cl. .............................. 714/14; 714/22; 714/48

(58) Field of Classification Search .................. 714/14, 714/21, 22, 48
See application file for complete search history.

(56) References Cited

U.S. PATENT DOCUMENTS

| | | | |
|---|---|---|---|
| 4,607,330 A * | 8/1986 | McMurray et al. ........... 714/14 |
| 6,145,102 A * | 11/2000 | Klein et al. .................... 714/48 |
| 6,308,240 B1 | 10/2001 | De Nicolo | |
| 6,308,289 B1 * | 10/2001 | Ahrens et al. ................ 714/48 |
| 6,365,859 B1 | 4/2002 | Yi et al. | |
| 6,718,474 B1 | 4/2004 | Somers et al. | |
| 6,832,324 B2 * | 12/2004 | Mullins et al. ............... 714/14 |
| 7,039,836 B2 * | 5/2006 | Powers et al. ................ 714/48 |
| 7,080,285 B2 * | 7/2006 | Kosugi et al. ................ 714/48 |
| 7,124,321 B2 * | 10/2006 | Garnett et al. ................ 714/14 |

* cited by examiner

*Primary Examiner*—Robert W Beausoliel, Jr.
*Assistant Examiner*—Joseph D Manoskey

(57) ABSTRACT

A method is disclosed for verifying compatibility of components in a computer system. In one aspect, the BIOS determines the identity of the computer motherboard and chassis, and reads a CPU register to determine MaxCPUPower. The BIOS determines a MaxHostPower value based on characteristics of the identified motherboard and chassis. If MaxCPUPower exceeds MaxHostPower, then an error handler is invoked. In another aspect, the BIOS reads a CPU register to determine MaxCPUTemp, and determines a MinHostTemp value based on the characteristics of the identified chassis and the value of MaxCPUPower. If MinHostTemp exceeds MaxCPUTemp, then an error handler is invoked.

24 Claims, 1 Drawing Sheet

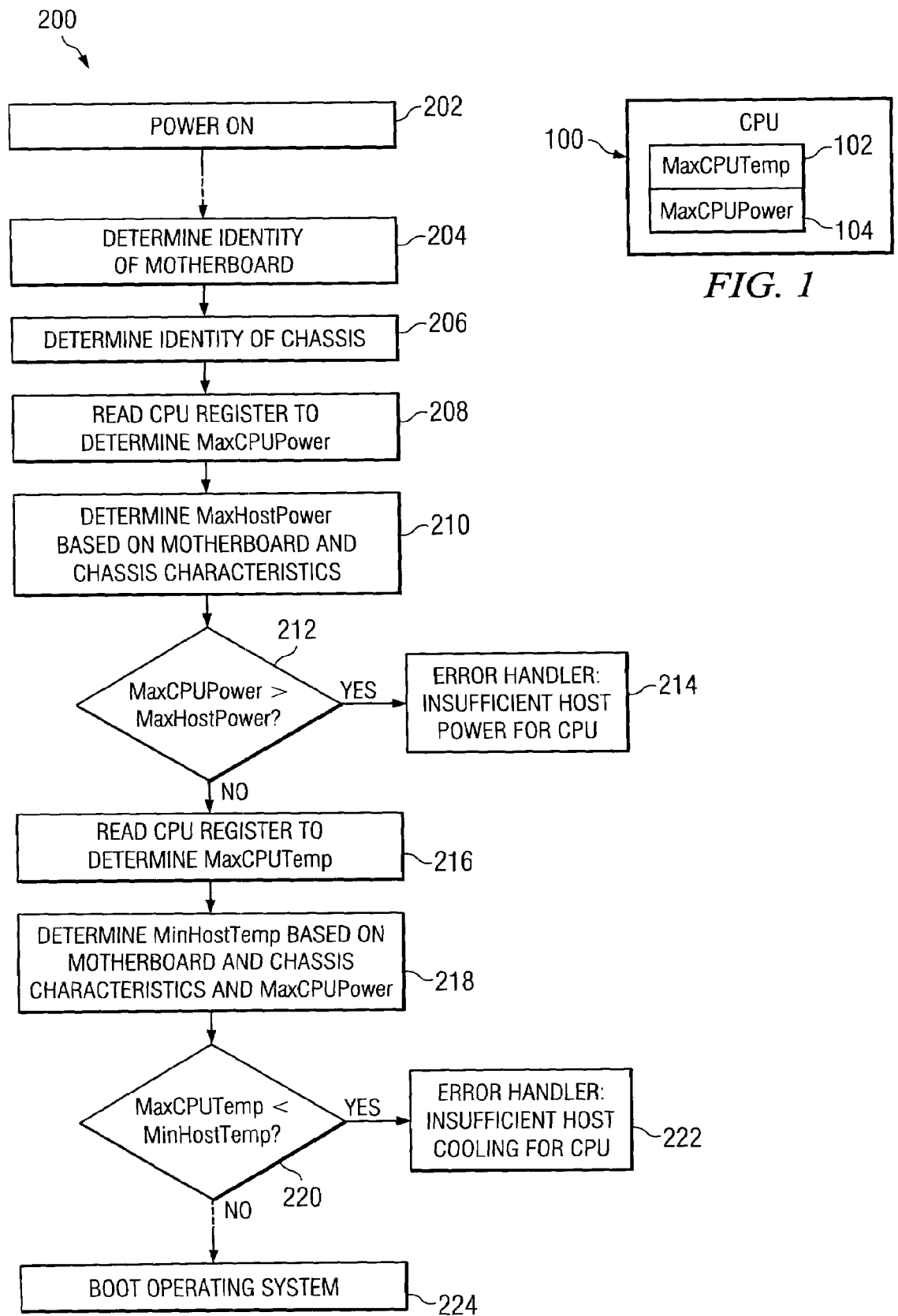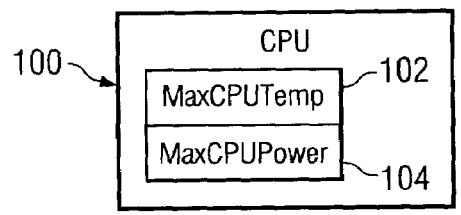

METHOD FOR VERIFYING THERMAL AND POWER COMPATIBILITY OF COMPONENTS IN A COMPUTER SYSTEM

FIELD OF THE INVENTION

This invention relates generally to automatic thermal and power management in computer systems.

BACKGROUND

In many computers, system firmware known as the basic input/output system ("BIOS") begins executing prior to transferring control of the computer to the operating system. During this initial execution, the BIOS typically performs a series of routines known as the power-on self test ("POST"). Even after POST has completed and the operating system has booted, the BIOS continues to provide basic services as needed as long as the computer is powered on.

Among the basic services provided by the BIOS in some computers is to control the speed of cooling fans disposed within the computer enclosure. Assuming that the BIOS knows the maximum temperature at which a central processing unit ("CPU") is rated by its manufacturer to operate, it can adjust fan speeds accordingly in response to the actual temperature sensed in the CPU at a given point in time. This is done so that fans can be run at lower rates of speed when it is possible to do so, thus reducing power consumption and lowering noise levels.

Currently, the BIOS is able to read registers within a CPU to determine the identity or model of the CPU. For example, existing registers might tell the BIOS that a CPU is an Intel Pentium IV. In order to make this information useful from a thermal management perspective, however, the BIOS must keep cross-reference tables so that it can determine the maximum temperature at which a particular CPU model is rated by its manufacturer to operate. When manufacturer specifications change for a given CPU model, or when new CPU models are introduced, the BIOS must be updated with new cross-reference tables.

SUMMARY OF THE INVENTION

In one aspect, the invention includes a method for verifying compatibility of components in a computer system. In an embodiment, BIOS firmware determines the identity of the host computer motherboard and chassis, and reads a CPU register to determine a MaxCPUPower value. The BIOS determines a MaxHostPower value based on the characteristics of the identified motherboard and chassis. If MaxCPUPower exceeds MaxHostPower, then an error handler is invoked. In another embodiment, the BIOS reads a CPU register to determine a MaxCPUTemp value. The BIOS determines a MinHostTemp value based on the characteristics of the identified chassis and the value of MaxCPUPower read from the CPU. If MinHostTemp exceeds MaxCPUTemp, then an error handler is invoked. In yet another embodiment, the BIOS may perform both tests.

A computer system configured in accordance with the invention provides a number of advantages. For example, the BIOS in such a system does not have to be updated as frequently as in prior art computer systems. In addition, the BIOS may improve acoustics by tailoring fan speeds to the individual characteristics of the installed CPU.

BRIEF DESCRIPTION OF THE DRAWINGS

FIG. 1 is a block diagram illustrating a CPU chip having MaxCPUTemp and MaxCPUPower registers therein.

FIG. 2 is a flow diagram illustrating a method for verifying compatibility of components in a computer system according to a preferred embodiment of the invention.

DETAILED DESCRIPTION OF THE PREFERRED EMBODIMENTS

FIG. 1 is a block diagram illustrating a CPU chip 100. CPU chip 100 contains a MaxCPUTemp register 102 and a MaxCPUPower register 104. MaxCPUTemp register 102 contains a value that indicates the maximum temperature at which CPU chip 100 is rated to operate. MaxCPUPower register 104 contains a value that indicates the maximum power CPU chip 100 is rated to consume during operation. In one embodiment, registers 102 and 104 may be two separate registers. In an alternative embodiment, they may be one combined register that holds both the MaxCPUTemp value and the MaxCPUPower value. Further references herein to either of the two registers are intended to include either possibility. Preferably, the registers 102 and 104 are capable of being read with an appropriate CPU instruction.

The MaxCPUTemp and MaxCPUPower values may be placed in registers 102 and 104 when CPU chip 100 is manufactured or tested. In one scenario, each CPU chip manufactured may be individually tested. In this scenario, the MaxCPUTemp and MaxCPUPower values placed in registers 102 and 104 would reflect values that are specific to that individual CPU chip. In a second scenario, tests may be performed on a manufactured lot of CPU chips (such as, for example, all CPU chips manufactured from a particular wafer) to determine temperature and power characteristics applicable to the lot. In a third scenario, the values written into registers 102 and 104 may simply reflect the specifications for all CPU chips having a particular model or version number (for example, all Pentium IV chips having a certain step number, or all such chips rated to operate at a particular clock frequency). In either of the first three scenarios, registers 102 and 104 may be configured as read-only registers so that the values contained therein would not be corrupted or lost after the CPU chip has been shipped. In a fourth scenario, registers 102 and 104 could be configured as nonvolatile read/write registers so that values could be placed therein based on testing that occurs after the CPU chip has been shipped.

FIG. 2 illustrates a method of using a CPU chip such as CPU chip 100 to verify compatibility of components in a computer system according to a preferred embodiment of the invention. In one embodiment, the method may be implemented in the BIOS. In alternative embodiments, the method may be implemented in other firmware, or in software or hardware. Although the description given herein will refer periodically to the BIOS as the acting agent, the description is intended to apply to either possibility.

One suitable time to execute method 202 is during POST, after the computer has been powered on in step 202 and before booting the operating system in step 224. The method may, however, be executed at other times as necessary or desirable. In steps 204 and 206, the BIOS determines the identity of the motherboard and the chassis of the host computer. This may be done using any available technique. One technique for identifying the motherboard is to read a register on the motherboard containing identifying information. A technique for identifying the chassis is to read a hardwired value coded onto the pins of any of the chassis connectors.

In step 208, the BIOS reads register 104 to determine the value of MaxCPUPower. In step 210, the BIOS determines a MaxHostPower value. Preferably, this value should indicate the maximum power that the host computer is capable of supplying to the CPU. Determining MaxHostPower may be done using any available technique. One technique is to use information gleaned from steps 204 and 206. For example, the identity of the motherboard may imply the existence of certain voltage regulation equipment. Or, the step of reading the identity of the motherboard may include reading voltage regulation characteristics from registers on the motherboard. Likewise, the identity of the chassis may imply the existence of certain power supply and cooling fan equipment. Or, the step of reading the identity of the chassis may include reading power supply and cooling characteristics directly from registers or hardwired locations. Once this information has been collected by suitable means, a lookup table may be consulted or an expression may be evaluated to determine the value of MaxHostPower.

In step 212, the BIOS compares MaxCPUPower with MaxHostPower. If MaxCPUPower exceeds MaxHostPower, then an error handling routine is invoked in step 214. A suitable error handler may, for example, cause an error message to be displayed on the host computer to alert the user. The error handler may also cause the computer to power down automatically. Or the error handler may display the error message, wait for a suitable amount of time (ten seconds, for example), and then power down the computer. Any of a variety of other error handlers may also be employed.

If MaxCPUPower does not exceed MaxHostPower, then execution continues with step 216. In step 216, the BIOS reads register 102 to determine the value of MaxCPUTemp. (As was noted above, the values of MaxCPUTemp and MaxCPUPower may come from different registers of CPU chip 100, or they may come from the same register.) In step 218, the BIOS determines a MinHostTemp value. Preferably, this value should indicate the minimum CPU temperature the host computer is capable of maintaining. Determining MinHostTemp may be done using any available technique. One technique is to use information gleaned from steps 204, 206 and 208. For example, once information has been collected about the cooling characteristics of the chassis/motherboard combination, a lookup table may be consulted or an expression may be evaluated to determine the value of MinHostTemp given the value of MaxCPUPower.

In step 220, the BIOS compares MaxCPUTemp with MinHostTemp. If MinHostTemp exceeds MaxCPUTemp, then an error handling routine is invoked in step 222. The error handler invoked in step 222 may be the same as or different than the error handler invoked in step 214, as appropriate. For example, the two error handlers may present different error messages on the display of the host computer. But if MinHostTemp does not exceed MaxCPUTemp, then execution continues normally at step 224.

When the computer is operating, the BIOS may use the information obtained during the above-described steps to tailor the speed of cooling fans responsive to the characteristics of CPU chip 100, thus possibly improving power consumption and noise levels in the host computer.

While the invention has been described in detail in relation to preferred embodiments thereof, the described embodiments have been presented by way of example and not by way of limitation. It will be understood by those skilled in the art that various changes may be made in the form and details of the described embodiments, resulting in equivalent embodiments that remain within the scope of the appended claims.

I claim:
1. A method of verifying compatibility of components in a computer system, comprising:
   reading, from at least one CPU register, a CPU maximum power value indicating the maximum power the CPU is rated to consume during operation;
   determining a host maximum power value indicating the maximum power the computer system is rated to supply; and
   if the CPU maximum power value exceeds the host maximum power value, invoking a first error handler.
2. The method of claim 1, further comprising:
   reading, from at least one CPU register, a CPU maximum temperature value indicating the maximum temperature at which the CPU is rated to operate;
   determining a host minimum temperature value indicating the minimum CPU temperature the host is rated to maintain; and
   if the host minimum temperature value exceeds the CPU maximum temperature value, invoking a second error handler.
3. The method of claim 2, wherein:
   the first and second error handlers are the same error handler.
4. The method of claim 2, wherein:
   the CPU maximum power value and the CPU maximum temperature value are read from the same CPU register.
5. The method of claim 1, wherein:
   determining the host maximum power value comprises identifying a motherboard and a chassis of the computer system.
6. The method of claim 5, wherein:
   identifying the motherboard comprises determining voltage regulation characteristics of the motherboard.
7. The method of claim 5, wherein:
   identifying the motherboard comprises reading a register on the motherboard.
8. The method of claim 5, wherein:
   identifying the chassis comprises determining power supply and cooling characteristics of the chassis.
9. The method of claim 5, wherein:
   identifying the chassis comprises reading hardwired pins of a chassis connector.
10. The method of claim 2, wherein:
    the host minimum temperature value is determined responsive to cooling characteristics of a chassis of the computer system and to the maximum CPU power value.
11. The method of claim 1, wherein:
    the first error handler causes an error message to be displayed.
12. The method of claim 1, wherein:
    the first error handler causes the computer system to be powered down.
13. A machine-readable storage medium containing code that, when executed on a computer system, causes the computer system to perform a method of verifying compatibility of its components, the method comprising:
    reading, from at least one CPU register, a CPU maximum power value indicating the maximum power the CPU is rated to consume during operation;

determining a host maximum power value indicating the maximum power the computer system is rated to supply; and if the CPU maximum power value exceeds the host maximum power value, invoking a first error handler.

14. The storage medium of claim 13, wherein the method further comprises:

reading, from at least one CPU register, a CPU maximum temperature value indicating the maximum temperature at which the CPU is rated to operate;

determining a host minimum temperature value indicating the minimum CPU temperature the host is rated to maintain; and if the host minimum temperature value exceeds the CPU maximum temperature value, invoking a second error handler.

15. The storage medium of claim 14, wherein:

the first and second error handlers are the same error handler.

16. The storage medium of claim 14, wherein:

the CPU maximum power value and the CPU maximum temperature value are read from the same CPU register.

17. The storage medium of claim 13, wherein:

determining the host maximum power value comprises identifying a motherboard and a chassis of the computer system.

18. The storage medium of claim 17, wherein:

identifying the motherboard comprises determining voltage regulation characteristics of the motherboard.

19. The storage medium of claim 17, wherein:

identifying the motherboard comprises reading a register on the motherboard.

20. The storage medium of claim 17, wherein:

identifying the chassis comprises determining power supply and cooling characteristics of the chassis.

21. The storage medium of claim 17, wherein:

identifying the chassis comprises reading hardwired pins of a chassis connector.

22. The storage medium of claim 14, wherein:

the host minimum temperature value is determined responsive to cooling characteristics of a chassis of the computer system and to the maximum CPU power value.

23. The storage medium of claim 13, wherein:

the first error handler causes an error message to be displayed.

24. The storage medium of claim 13, wherein:

the first error handler causes the computer system to be powered down.

* * * * *